Figure 1:
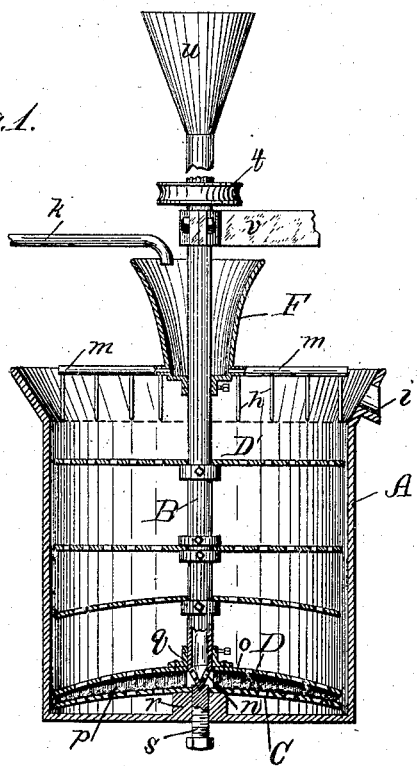

(No Model.)

S. L. TRIPPE.
APPARATUS FOR AMALGAMATING AND SEPARATING GOLD, &c., FROM THEIR ORES.

No. 271,162. Patented Jan. 23, 1883.

Witnesses:
C. E. Gaylord.
C. W. Leimbach.

Inventor:
Sylvanus L. Trippe
By R. C. Dyrenforth,
Attorney.

UNITED STATES PATENT OFFICE.

SYLVANUS L. TRIPPE, OF CHICAGO, ILLINOIS, ASSIGNOR OF ONE-HALF TO ABEL H. BLISS, OF SAME PLACE.

APPARATUS FOR AMALGAMATING AND SEPARATING GOLD, &c., FROM THEIR ORES.

SPECIFICATION forming part of Letters Patent No. 271,162, dated January 23, 1883.

Application filed November 22, 1882. (No model.)

*To all whom it may concern:*

Be it known that I, SYLVANUS L. TRIPPE, a citizen of the United States, residing at Chicago, in the county of Cook and State of Illinois, have invented certain new and useful Improvements in Apparatus for Amalgamating and Separating Gold and Other Metals from their Ores by Means of Mercury; and I hereby declare the following to be a full, clear, and exact description of the same.

My invention relates to certain improvements upon the apparatus shown and described in Letters Patent of the United States, No. 264,422, which were granted to me September 12, 1882. The process which the apparatus is designed to carry into effect is fully described in my said former Letters Patent, and therefore need not be repeated here. It will be sufficient to say that by that process the ore, in a finely-divided state and wet to a pulp, is fed into the base of a bath of mercury contained in a suitable vessel, and is there mixed with the mercury and allowed to rise through the same, or to descend to the bottom wholly by the natural law of gravity, those constituent parts having a greater specific gravity than mercury naturally tending downward, sooner or later, while those having a less specific gravity than mercury tend upward. Some parts of the mineral contained in the ore amalgamate, while others do not; but the process serves to effect the desired separation, irrespective of the degree to which the amalgamation progresses, as all of the gold or other metal having a greater specific gravity than mercury ultimately descends to the bottom, whether amalgamated or not. Those constituents which rise to the surface of the mercury are washed away by means of a suitable contrivance for that purpose.

As is stated in the specification of my Letters Patent above referred to, a mechanical device by which the ore is injected into the base of the mercury bath, and by which the requisite agitation and mixing are effected, as well as an arrangement of perforated diaphragms placed at different levels in the mercury bath, are essential, in some form or other, to the successful carrying out of the process, the purpose of these perforated diaphragms being to prevent the formation of upward currents in the mercury, since the effect of this would be to carry the material up in columns or masses, and, to a considerable extent, without reference to its specific gravity, whereby more or less of the precious metal would be carried to the surface with foreign matter and washed away.

My present invention relates to that part of the apparatus by which the comminuted ore is disseminated through the mercury and mixed therewith at about the plane of its introduction, and also to means for washing away the foreign constituents at the surface.

Figure 2:
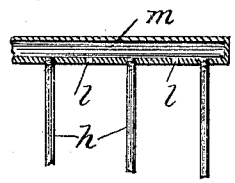
Figure 3:
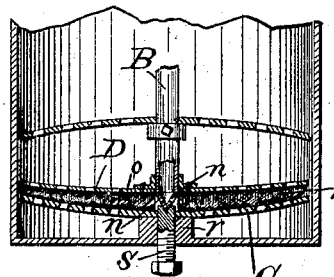
Figure 5:
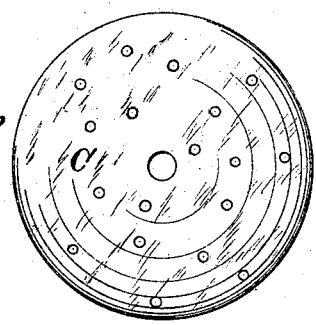
Figure 6:
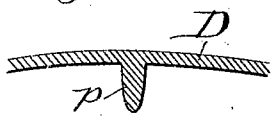

Referring to the accompanying drawings, Figure 1 is a vertical section of my apparatus; Fig. 2, an enlarged detail section of one of the radial perforated pipes provided with stirrers, which are employed for washing away the lighter constituents at the surface of the mercury; Fig. 3, a broken section of the device represented in Fig. 1, showing a modification; and Figs. 4, 5, and 6, detail views.

A is a vessel, preferably made flaring at its upper end and cylindrical elsewhere, as shown, and B a pipe standing in a seat in the bottom of the vessel, and stayed by a suitable bearing, $v$, above the vessel. This pipe is provided with a hopper, $u$, at its upper end, and also with a fixed pulley, $t$, or some analogous contrivance to permit it to be revolved.

The seat of the pipe B consists preferably of an adjusting-screw, $s$, passing through the bottom of the vessel, whereby the turning of the screw raises or lowers the pipe B, and with it the parts connected thereto, hereinafter described. Above the bottom of the vessel, on the top of the socket-projection $r$, through which the set-screw passes, or otherwise rigidly maintained in place, is a concavo-convex disk, C, with its concave side either downward, as shown in Fig. 1, or upward, as shown in Fig. 3, and provided with perforations to enable the metal to pass down through it to the bottom of the vessel.

Figure 4:
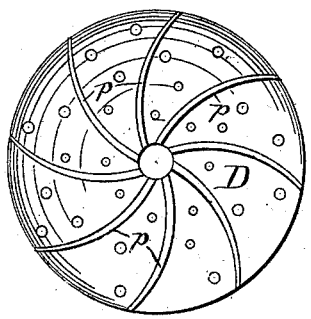

Fixed to the shaft B immediately above the disk C is a perforated diaphragm, D, of concavo-convex form, corresponding with that of the disk C, with which it is nearly or quite parallel. It is fixed rigidly to the shaft B by means of a collar and set-screw, q, whereby it turns with the shaft, and may be adjusted higher or lower thereon, as circumstances may require; and it is provided on its lower face with a series of ribs, p, either radial or oblique, or, as shown in Fig. 4, curved. Each rib is broadest at its inner end and tapers to a point at its outer end, but is of the same height, or nearly so, throughout its entire length, whereby it may come in full contact with the disk C. The perforations of the disk D increase in size gradually as they approach the outer edge, and the inner portion of the disk is unperforated, as shown at o. The object of this construction will appear further on.

Above the diaphragm D is a series of perforated diaphragms upon the shaft, some fixed rigidly thereto and some loose thereon, and part of them curved and part of them horizontal, but all capable of adjustment to higher or lower levels by means of collars and set-screws. While, as stated in my former Letters Patent, I do not limit myself to the number or arrangement of these perforated diaphragms, I prefer to have the uppermost one, D', loose upon the shaft, whereby it remains stationary, and those intermediate between the diaphragms D and D' alternately fixed and loose, as represented in the drawings. By means of the collars and set-screws the diaphragms may be independently adjusted to different levels upon the shaft. The loose ones may be fastened to the sides of the vessel to prevent them from lifting and turning.

The lower part of the shaft B is provided with openings n between the disk C and the ribbed perforated diaphragm D immediately above it. Through these openings the pulp which is fed into the hopper at the top of the shaft works its way out between the ribs p, and since the shaft revolves, carrying with it the disk D, with its ribs, while the disk C is stationary, the device acts as a muller to rub and mix the ore and mercury thoroughly together. Gradually more or less of the constituents having a greater specific gravity than mercury find their way through the apertures and over the edges of the disk C to the bottom of the vessel, while some of these heavier constituents find their way, with the lighter particles, upward through and around the perforated diaphragm D. In consequence of the unperforated space near the center of this diaphragm, followed by perforations, small at first and gradually increasing in size, as described, the upward progress of the ore is resisted most in the vicinity of its discharge into the mercury and less and less as it progresses laterally outward, thus causing the gold to separate and settle down largely at the beginning. In their progress to the top through the various perforated diaphragms the lighter particles become divested more and more of metal having a greater specific gravity than mercury, and this metal, when freed, proceeds downward, ultimately finding its way to the bottom of the vessel. As before stated, more or less of it is amalgamated, but whether amalgamated or not the effect, so far as settling to the bottom of the vessel is concerned, is the same. With such a device it is next to impossible for any particle of gold, platinum, or other metal having a greater specific gravity than mercury to find its way to the surface, since the perforated diaphragms offer constant obstruction, and thus prevent the forming of upward currents, but cause the ore to pass upward in a diffused and distributed state.

In the apparatus described in my former patent the function performed by the perforated disk C and ribbed perforated diaphragm D is in part performed by a series of radial hollow arms of varying lengths. The present device is not intended to supersede the other under all circumstances, but will be found preferable in many cases.

For the purpose of washing off the foreign matter at the surface of the mercury, I employ a vessel, F, surrounding the tubular shaft B, and secured thereto, as shown, whereby it revolves with the shaft, which vessel is provided at or near its base with one or more laterally-branching tubes, m, closed at their outer ends, and having perforations l in their lower sides. A pipe, k, conducts water into the vessel, and the water discharging through the perforations in the tubes m, which of course revolve with the shaft B, constantly dilutes the ore and carries it off through an overflow, i, near the top of the vessel. The addition of stirrers h, projecting down from the tubes m, nearly or quite to the mercury-level, tends to accelerate this action.

What I claim as new, and desire to secure by Letters Patent, is—

1. The combination of the vessel A, pipe B, provided with openings n near its lower end, mechanism for rotating the said pipe, concavo-convex disk C, having perforations, and supported above the bottom of the vessel, below the openings n in the pipe B, concavo-convex perforated and ribbed diaphragm D, fixed to the pipe B, immediately above the openings n, and one or more perforated diaphragms supported within the vessel A, above the diaphragm D, substantially as described.

2. The combination, with the vessel A for containing mercury, rotary pipe B, having openings near its base, and mechanism for diffusing the pulp discharged from the pipe B into the base of the mercury, of the device for washing the foreign matter from the surface of the mercury, comprising the vessel F for containing water, surrounding and fixed to the pipe B, whereby it revolves with said pipe, and provided with one or more laterally-branching tubes, m, closed at their outer ends, and having perforations in their lower sides, substantially as described.

SYLVANUS L. TRIPPE.

In presence of—
WM. H. DYRENFORTH,
ADELBERT HAMILTON.